United States Patent
May et al.

(10) Patent No.: US 7,402,981 B2
(45) Date of Patent: Jul. 22, 2008

(54) METHOD AND APPARATUS TO PERFORM BATTERY CHARGING USING A DC-DC CONVERTER CIRCUIT

(75) Inventors: Marcus W. May, Austin, TX (US); Matthew D. Felder, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 569 days.

(21) Appl. No.: 10/675,116

(22) Filed: Sep. 30, 2003

(65) Prior Publication Data
US 2005/0001595 A1    Jan. 6, 2005

Related U.S. Application Data

(60) Provisional application No. 60/484,558, filed on Jul. 2, 2003.

(51) Int. Cl.
*H01M 10/46* (2006.01)
(52) U.S. Cl. ..................... 320/137
(58) Field of Classification Search ............. 320/107, 320/112, 114, 115, 137, 138
See application file for complete search history.

(56) References Cited

U.S. PATENT DOCUMENTS

| | | | | |
|---|---|---|---|---|
| 5,136,229 A | * | 8/1992 | Galvin | 320/112 |
| 5,818,203 A | * | 10/1998 | Narita | 320/128 |
| 5,945,807 A | * | 8/1999 | Faulk | 320/128 |
| 6,100,670 A | * | 8/2000 | Levesque | 320/150 |
| 6,184,660 B1 | * | 2/2001 | Hatular | 320/141 |
| 6,204,651 B1 | | 3/2001 | Marcus et al. | |
| 6,634,896 B1 | * | 10/2003 | Potega | 439/218 |
| 6,969,972 B2 | * | 11/2005 | Formenti | 320/128 |
| 2002/0117998 A1 | * | 8/2002 | Olsen | |

* cited by examiner

*Primary Examiner*—Edward Tso
(74) *Attorney, Agent, or Firm*—Garlick Harrison & Markison; Timothy W. Markison

(57) ABSTRACT

A battery converter, which is used to convert battery voltage to an output voltage to power an integrated circuit in a battery-operated mode, is placed into a battery-charge mode to charge the battery when external power source is present to power the integrated circuit and the battery needs charging.

19 Claims, 4 Drawing Sheets

METHOD AND APPARATUS TO PERFORM BATTERY CHARGING USING A DC-DC CONVERTER CIRCUIT

CROSS REFERENCE TO RELATED APPLICATION

This application claims the benefit of U.S. Provisional Patent Application Ser. No. 60/484,558; filed Jul. 2, 2003; and titled "Method And Apparatus To Perform Battery Charging Using A DC-DC Converter Circuit."

BACKGROUND OF THE INVENTION

1. Technical Field of the Invention

The embodiments of the invention relate to the charging of rechargeable batteries and, more particularly, to utilizing a DC-DC converter circuit of an integrated circuit chip to charge a battery.

2. Description of Related Art

A variety of electronic equipment, especially portable or handheld electronic devices, are capable of being powered from a battery. Some of these portable and/or handheld devices include, but are not limited to, laptop or notebook computers, personal digital assistants (PDAs), compact disc (CD) players, digital video disc (DVD) players, MP3 (an audio standard under the Moving Picture Experts Group or MPEG) players, AM/FM (amplitude modulation/frequency modulation) radios, pagers, cellular telephones, etc. These devices typically contain one or more integrated circuit chip(s) to perform the operations(s) intended by the device. Many, if not most, of these devices may be powered by self-contained power sources, such as a battery. In many instances, the batteries may be rechargeable.

When a rechargeable battery is present in a portable or handheld device, the battery may be recharged by the use of an internal or an external battery charger. In some instances, it may be desirable to have an internal battery charger so that a separate external charger unit is not needed.

In a typical setup to charge a rechargeable battery, where the battery charging is provided by an internal battery charger, the device or chip includes a battery charging circuit to charge the battery. Typically, a separate and distinct battery charging circuit is utilized and this charging circuit is activated when an external power source is coupled to the device. For example, the charging of the battery by the charging circuit commences when the device is coupled to an external power source, such as a wall outlet. However, in some instances, external power is provided by other sources, rather than the alternating current (AC) power source.

As an example, in today's applications, certain interfaces may provide power through the interface itself. A bus specification, such as a Universal Serial Bus Revision 2.0 specification (USB 2.0), provides not only protocol for data transfer between two devices, but the USB 2.0 bus specification also provides a power link between a USB host and a USB device coupled onto the USB. For example, a peripheral device (such as an MP3 player), when coupled to a host (such as a personal or laptop computer) through a USB 2.0, the USB link not only provides the data lines for data transfer between the two devices, but +5 volts (nominal) is also provided to the peripheral through the interconnect. Thus, devices coupled onto the USB 2.0 may utilize the voltage provided on the bus to power circuitry of the peripheral component.

Accordingly, it would be advantageous to utilize the power supplied by an interconnection bus, such as USB 2.0, not only to provide the power to the component for its operation, but to utilize that power also to charge the battery. However, there may be a limitation on the current that may be drawn from such a power source. A general USB hub, for example, may be limited to a current of 0.1 amperes that may be draw from the hub. Thus, current drawn may be a consideration when using such sources for battery charge.

Also, it may be advantageous to combine the DC-DC converter circuit and the battery charging circuit, in order that some circuit components may be used in duplicity to reduce the number of components that may be needed to provide both the DC-DC conversion and battery charging operations.

SUMMARY OF THE INVENTION

A converter within an integrated circuit is used to convert a battery voltage from a battery to an output voltage to power the integrated circuit in a battery-operated mode when the battery is present. A control unit is used to switch the converter to a battery-charge mode to charge the battery when external power is supplied to power the integrated circuit. The external power is used to power the converter and to charge the battery.

In one embodiment, a switching transistor circuit is used to convert a battery voltage from a battery to an output voltage to power the integrated circuit in the battery-operated mode when the battery is present. A control unit is used to control the mode of operation of the switching transistors between three modes of operation. The battery-operated mode is the first mode of operation. The second and third modes of operation are an external powered mode and a battery-charge mode. Both of these modes are utilized when external power is present. In the external powered mode, the external power is used to generate a voltage source to generate the output voltage. The switching transistor circuit is disabled in the external powered mode. In the battery-charge mode, the switching transistor circuit is enabled and the external power is used to generate a current source to supply the current to the load as well as to charge the battery.

In one embodiment, a converter is implemented in an integrated circuit which has a complete audio system integrated therein. In one embodiment, the external power is obtained from a data transfer link, such as a Universal Serial Bus (USB) link.

DETAILED DESCRIPTION OF THE EMBODIMENTS OF THE INVENTION

The embodiments of the present invention may be practiced in a variety of settings that implement a power converter, such as a direct current-direct current (DC-DC) converter and a battery charger. For example, in one embodiment of the invention, a DC-DC converter portion of the converter/charger unit receives power from the battery and converts the battery voltage to an output voltage which is utilized by other component(s) (load) powered by the DC-DC converter. Whenever external power (such as the power provided by USB 2.0 interconnect) is present, this external power is used to power the load. The external power may also be coupled to the converter/charger unit to charge the battery. In this arrangement, the battery may be charged from a USB 2.0 interface. Furthermore, utilizing common components in the converter/charger unit also allows duplicity of certain circuit components so that total component count may be reduced to perform both the DC-DC conversion and battery charging operations. Although a variety of different systems and components may be implemented, a particular system implementation is illustrated in FIG. 1 as one embodiment of a system to practice the invention.

Figure 1:
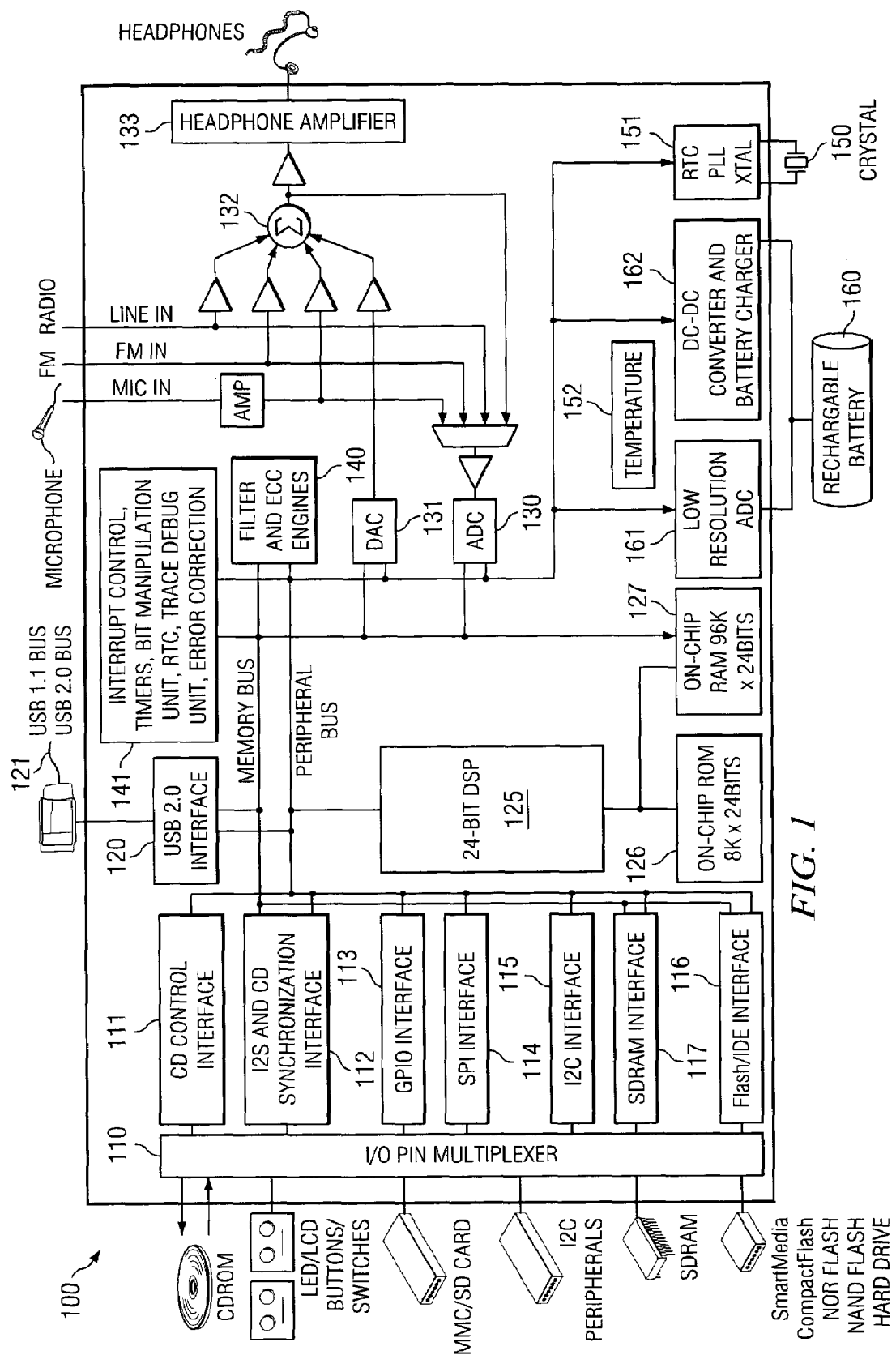
FIG. 1 is a block schematic diagram of an example integrated circuit chip operating as an audio system on a chip.

Referring to FIG. 1, an example integrated circuit (IC) 100 is shown in which one embodiment of the invention is implemented within IC 100. The example IC 100 is a single IC chip that implements a complete audio system. It is to be noted that the example embodiment of FIG. 1 implements a complete audio system on a single chip, but other embodiments of the invention may incorporate one or more integrated circuit chips to provide a complete system or parts of a system.

As illustrated in FIG. 1, a variety of blocks are noted within the confines of IC 100. The various blocks exemplify hardware components, software and interfaces resident within IC 100. The example audio system of IC 100 may operate with one or a variety of devices, as illustrated in FIG. 1. Accordingly, a CD (compact disc); LED (Light Emitting Diode)/LCD (Liquid Crystal Display) displays, buttons and/or switches; MMC (Multimedia Card)/SD (Secure Digital) cards; I2C peripherals; SmartMedia, Compact Flash, NOR Flash, NAND Flash, and/or hard drive devices; and memory, such as SDRAM (Synchronous Dynamic Random Access Memory), are some components that may be coupled to IC 100 through an I/O (input/output) pin multiplexer 110, as is illustrated in FIG. 1. These various multiplexed connections are coupled to respective interfaces, as shown in FIG. 1. These interfaces include CD control interface 111; I2S and CD synchronization interface 112; GPIO (General Purpose Input/Output) interface 113, SPI (Serial Peripheral Interface) interface 114; I2C interface 115; Flash/IDE (Integrated Device Electronics) interface 116; and SDRAM interface 117.

Furthermore, a USB 2.0 interface 120 allows the coupling of a USB connection external to the IC 100. In the particular embodiment shown, USB 2.0 interface 120 is compatible with the USB 2.0 and backward compatible to a USB 1.1 protocol. A microphone input, radio input and a line input are also available on IC 100 to allow interconnection to a microphone, radio, or other audio input.

The core of the IC 100 is a DSP (Digital Signal Processor) 125, which in this embodiment is a 24-bit DSP. An on-chip ROM (Read Only Memory) 126 and an on-chip RAM (Random Access Memory) 127 operate as memory for DSP 125. An analog-to-digital converter (ADC) 130 allows for analog inputs to be converted to digital format for processing by DSP 125. Similarly, a digital-to-analog converter (DAC) 131 is present to convert digital signals to analog signals for output in analog form. In this instance, amplified signals through a summation node 132 and headphone amplifier 133 generate an amplified analog signal output external to IC 100. For example, the analog output may be operably coupled to a set of headphones. Also included within IC 100 is a filter and ECC (Error Correction Circuit) engines 140 to provide filtering and error correction operations. Other functions are shown within block 141 to provide various control and timing functions. These may include Interrupt Control, Timers, Bit Manipulation Unit, Real Time Clock (RTC), Trace Debug Unit, and error correction just to name a few of the operations.

Also within IC 100 is a RTC PLL (Real Time Clock/Phase Lock Loop) circuit 151, which is coupled to an external crystal 150 to provide an accurate clocking signal for circuits of IC 100. Memory and peripheral buses are also present within IC 100 for transfer of data and signals. A temperature sensor circuit 152 is present to monitor the temperature of the IC 100.

In FIG. 1, a rechargeable battery 160 is shown coupled to a low resolution ADC 161 and a DC-DC converter and battery charger unit 162. ADC 161 monitors the battery voltage to determine if the battery voltage is such that battery 160 may require charging or if the battery is fully charged. The ADC 161 may also monitor the battery voltage to determine if a battery is present. Thus, if the battery is not present or is removed during use, IC 100 detects the absence of the battery through the monitoring provided by the ADC 161. The DC-DC converter and battery charger unit 162 has a dual function. In the first operative mode, the DC-DC converter portion of converter/charger unit 162 is utilized to convert the battery voltage to an operative voltage utilized by components of the IC 100. When unit 162 is utilized as a battery charger, unit 162 charges the rechargeable battery under control of software, as is explained further in this disclosure.

In one embodiment, rechargeable battery 160 is coupled to IC 100 in order to provide a power source to the various circuitry present on IC 100. As noted above, low resolution ADC 161 monitors the battery voltage to identify if the battery is present (or not present) and also to determine if the battery requires charging. Without an external power source coupled to IC 100, the battery provides the requisite power to IC 100. The DC-DC converter portion of converter/charger unit 162 provides the conversion of the battery voltage to operate the various circuitry (load) of IC 100.

A variety of batteries may be utilized for battery 160 and, as noted above, battery 160 is a rechargeable battery. In one particular embodiment, the rechargeable battery is a Nickel Metal Hydride (NiMH) battery. It is to be noted that various other batteries may be utilized, including alkaline cells and lithium ion (LiON) batteries. Generally, battery 160 provides a voltage in the range of 0.9 to 3.6 volts to IC 100. In the instance where a NiMH battery is used, the typical range is 0.9 to 1.25 volts. Since the voltage from the battery may vary, and/or the circuitry may require voltages other than what is provided by the battery, the DC-DC converter portion of converter/charger unit 162 provides conversion of the battery voltage to one or more voltages utilized on IC 100. In some embodiments, converter/charger unit 162 may provide more than one DC conversion from the battery. For example, in one embodiment a NiMH battery of 0.9 to 1.25 volts may provide nominal chip voltage of 3.3 volts to the load. In another a combination of 3.3 volts and 1.8 volts are provided to the load. The disclosure below references a converted voltage of approximately 3.3 volts for use by the internal circuitry of IC 100, but other voltages may be sourced. Thus, in one embodiment of the invention, a NiMH battery of approximately 0.9-1.25 volts is coupled to converter/charger unit 162 to have the battery voltage converted to a voltage of approximately 3.3 volts (nominal) at the output of the converter. The 3.3 volts is referenced as $V_{OUT}$ in the subsequent FIGS. and is typically utilized as the power or rail voltage for the load.

The IC 100 is designed to also operate from other external power sources, when such power source(s) is/are coupled to the IC 100. One of the power sources may be provided through the USB 2.0 interface 120. The USB 2.0 protocol specifies the transfer of data by the use of differential data lines through a USB link, such as bus 121. The data is generally provided on a differential lines (D+ and D− lines). The USB 2.0 protocol also specifies the presence of a +5 volt DC voltage through bus 121 through $V_{BUS}$ and ground (GND) connections. Thus, an external power source having a voltage of approximately +5 volts may be used as a power source for IC 100 through the USB 2.0 interface 120 when bus 121 is coupled to IC 100. In this instance, a USB host provides the 5 volts, while IC 100 operates as a USB device coupled to the USB host. The IC 100 then may use the 5 volts to power components or circuitry on IC 100 provided the various USB specification requirements are met.

In the particular embodiment of FIG. 1, when external power is not present, the converter/charger unit 162 operates in a first mode of operation, noted as a battery-operated mode. In this mode, the battery 160 provides the power source to the IC 100. However, when the bus 121 is coupled to IC 100, the 5 volts from the USB host is used to power the internal circuitry of IC 100, instead of the battery 160. In a second mode of operation, noted as an external powered mode, the external power is used to generate a voltage source to power the internal circuitry. In the external powered mode, the converter/charger unit 162 is disabled. In a third mode of operation, noted as the battery-charge mode, the external power is used to generate a current source and the converter/charger unit 162 is enabled. In the battery-charge mode of operation, the external power uses the converter/charger unit to regulate the output voltage to power the internal circuitry and also to charge the battery 160.

Thus, with the presence of the $V_{BUS}$ voltage, the DC-DC converter portion of converter/charger unit 162 may operate in either the external powered mode or the battery-charge mode. The converter/charger unit 162 may be disabled, so that the battery 160 is not charged or it may be enabled to charge the battery 160. In either case, the $V_{BUS}$ voltage provides the power. As will be described below, the converter/charger unit 162 has three modes of operation, in which two modes (external powered and battery-charge modes) are employed when the external $V_{BUS}$ voltage provided on bus 121 is present.

Figure 2:
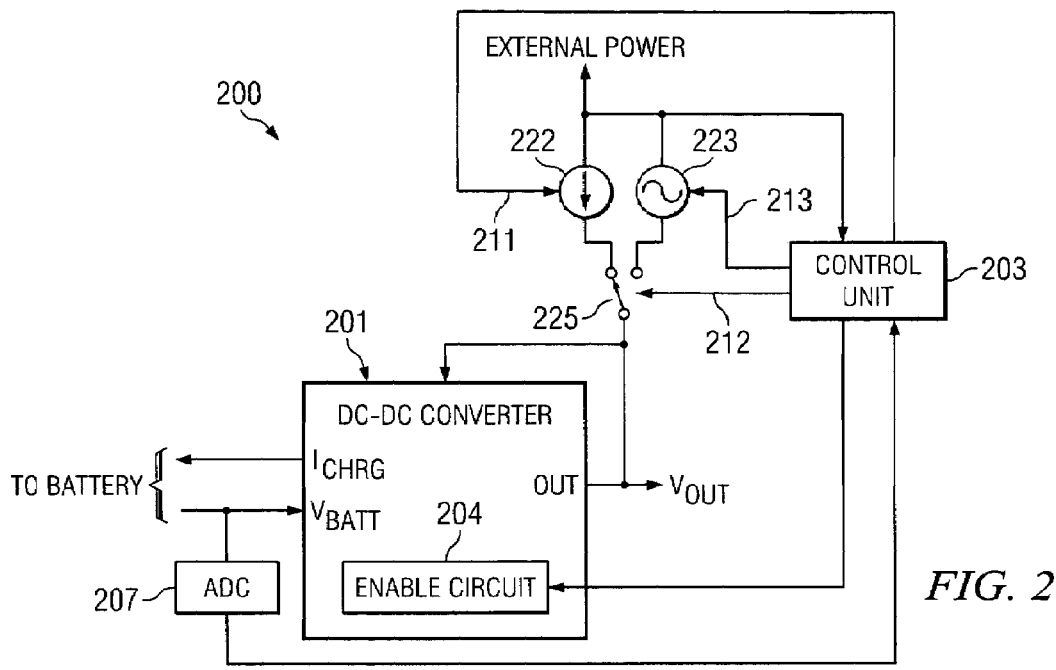
FIG. 2 is a block schematic diagram illustrating a dual function DC-DC converter/charging circuit as one embodiment for practicing the invention in which three modes of operation are present.

Referring to FIG. 2, a circuit 200 is shown. Circuit 200 illustrates one embodiment of the invention to utilize the DC-DC converter for both the conversion of the battery voltage, as well as the use of the converter to charge a rechargeable battery. When an external power source is not being utilized to generate $V_{OUT}$ to power various components and circuitry, the battery is used. Thus, without the presence of an external power source (battery-operated mode), a DC-DC converter 201 receives the battery voltage ($V_{BATT}$) and converts the battery voltage to $V_{OUT}$ at the output of DC-DC converter 201. When external power is coupled to circuit 200, the external power source is used to generate a voltage source 223 to provide $V_{OUT}$ to the load, if the battery is not being charged (external powered mode). In this second mode of operation, the DC-DC converter 201 is disabled (made inactive). However, if the battery is to be charged, the third mode (battery-charge mode) is used. In the battery-charge mode, the external power source is used to generate a current source 222 and the DC-DC converter 201 is enabled (made active). The current source 222, in combination with the enabled DC-DC converter 201, provides $V_{OUT}$ and excess current not applied to the load is used as the charging current to charge the battery.

In one embodiment, the external power, whether used to generate a current source 222 or a voltage source 223, may be controlled by a control unit 203. The control unit 203, which may be in the form of hardware, software, or a combination of both, controls the value of the voltage or current being sourced from voltage source 223 or current source 222. Control line 211 regulates the current of current source 222 and control line 213 controls the voltage from voltage source 223. Thus, with the external power coupled to circuit 200, the battery is not used to generate $V_{OUT}$. Control unit 203 also monitors the presence of the external power, so that if external power is not present, the battery powers the DC-DC converter 201 in the battery-operated mode. As noted, control line 212 from the control unit 203 controls switch 225 to place either the current source 222 or the voltage source 223 into the circuit, when external power is present.

In operation, control unit 203 monitors the presence of the external power and if the external power is not present, control unit 203 enables the converter 201 through its enable circuit 204. In this first (or battery-operated) mode of operation, the DC-DC converter 201 operates as a voltage converter and converts the battery voltage input $V_{BATT}$ to generate $V_{OUT}$. Since external power is not present, the current source 222 and the voltage source 223 are not operational. $V_{OUT}$ is generated by the conversion of the battery voltage by the DC-DC converter 201. In this battery-operated mode of operation, control unit 203 enables the DC-DC converter through the enable circuit 204.

When external power is present, control unit 203 controls the operation of switch 225 so as to place either the current source 222 or voltage source 223 onto the $V_{OUT}$ output line. In the second (or external powered) mode of operation, the voltage source 223 is switched in by switch 225 and the DC-DC converter is disabled by the enable circuit 204. The voltage source 223 supplies the $V_{OUT}$ to the internal circuitry. The control unit 203 through control line 213 maintains the regulation to generate $V_{OUT}$.

Alternatively, when external power is present, the control unit may switch in the current source 222 to place circuit 200 in the third (or battery-charge) mode of operation. In the battery-charge mode of operation, the enable circuit 204 enables the DC-DC converter 201 while the current source 222 is operably coupled to $V_{OUT}$. The DC-DC converter 201 regulates a substantially fixed voltage rail (such as 3.6V) from an external input (such as 5V) and directs the current not required by the load into the battery.

In FIG. 2, an ADC unit 207 monitors the battery voltage and provides an output to control unit 203. Thus, if a battery is not present, ADC unit 207 detects the absence of the battery and control unit 203 does not place converter 201 into the battery-charge mode. Similarly, if the battery is fully charged, ADC unit 207 also detects a full charge of the battery and control unit 203 stops charging the battery and places the circuit into the external powered mode. Thus, ADC unit 207 monitors the battery voltage so that the control unit 203 may switch between current source 222 and voltage source 223, depending on whether the battery needs charging.

It is to be noted that circuit 200 of FIG. 2 may be implemented within converter/charger unit 162 of FIG. 1. The ADC unit 207 may be implemented in the converter or it may be implemented as a separate ADC 161, as shown in FIG. 1. It is also to be noted that control unit 203 may reside within converter/charger unit 162 of FIG. 1 or elsewhere on IC 100, if circuit 200 is implemented in IC 100 of FIG. 1. If implemented as software, the program itself may reside in a memory location, including on-chip ROM 126 or on-chip RAM 127 of IC 100 in FIG. 1. Furthermore, two lines are shown to the battery for circuit 200 to provide the $V_{BATT}$ to converter 201 and a separate line for the charging of the battery by the application of the charging current $I_{CHRG}$. However, it is to be noted that both operations may be provided on the same line. Thus, by the application of control unit 203 and enable circuit 204, when external power is present, the DC-DC converter 201 may operate as a conversion circuit to generate $V_{OUT}$ in the battery-operated mode or it may be activated to charge the battery in the battery-charge mode.

Figure 3:
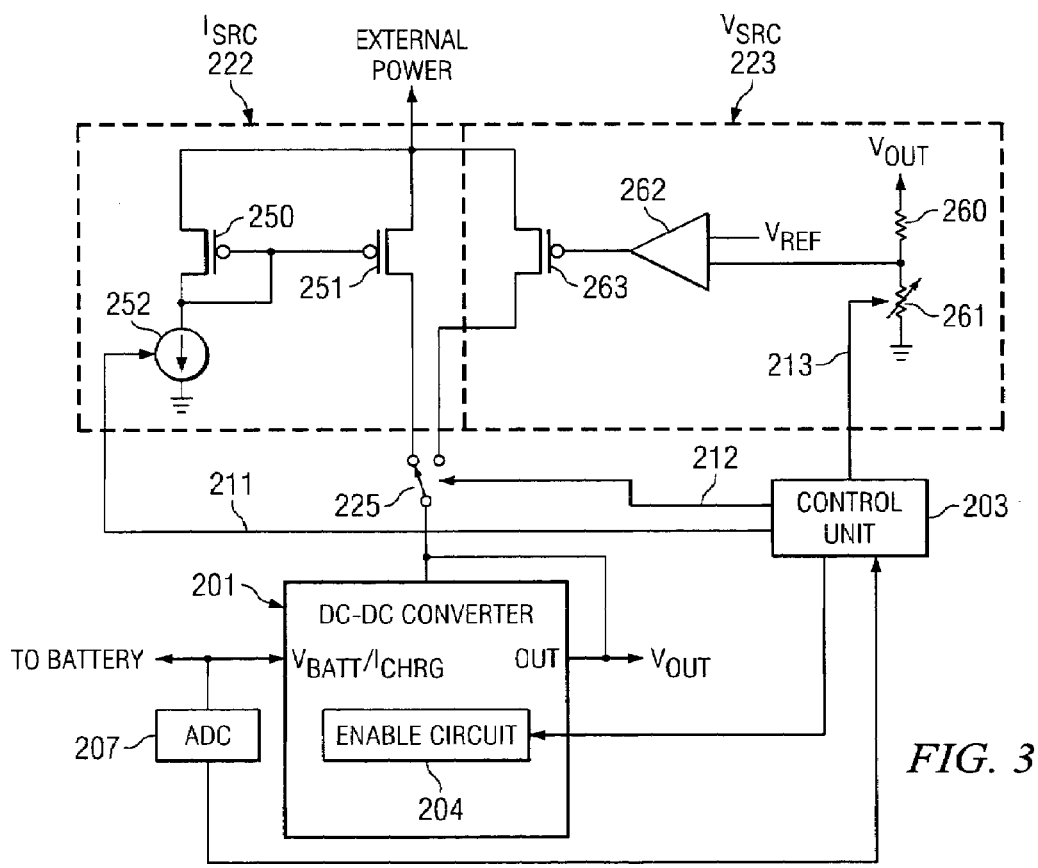
FIG. 3 is a more detailed schematic diagram for the circuit of FIG. 2, in which a more detailed circuit is provided to show sourcing of current during a battery-charge mode and sourcing of voltage during an external powered mode when the battery is not being charged.

Referring to FIG. 3, a more detailed schematic diagram is shown as one embodiment for the current source 222 and voltage source 223. The current source 222 employs a pair of transistors 250, 251, which essentially operate as current mirrors for sourcing current 252. The control unit 203 controls the value of the current of sourcing current 252 through control line 211. The voltage source 223 employs a voltage divider network of resistors 260, 261 and operational amplifier 262 to set a voltage, which is used to bias the gate of transistor 263. This bias voltage controls the operation of transistor 263 to maintain $V_{OUT}$ at the desired value. The control unit 203, through control line 213, controls the bias setting by controlling the voltage drop across the divider network of resistors 260, 261. The control unit 203 controls the selection of either the current source 222 or voltage source 223 by controlling the switch 225 through control line 212, when external power is present.

Figure 4:
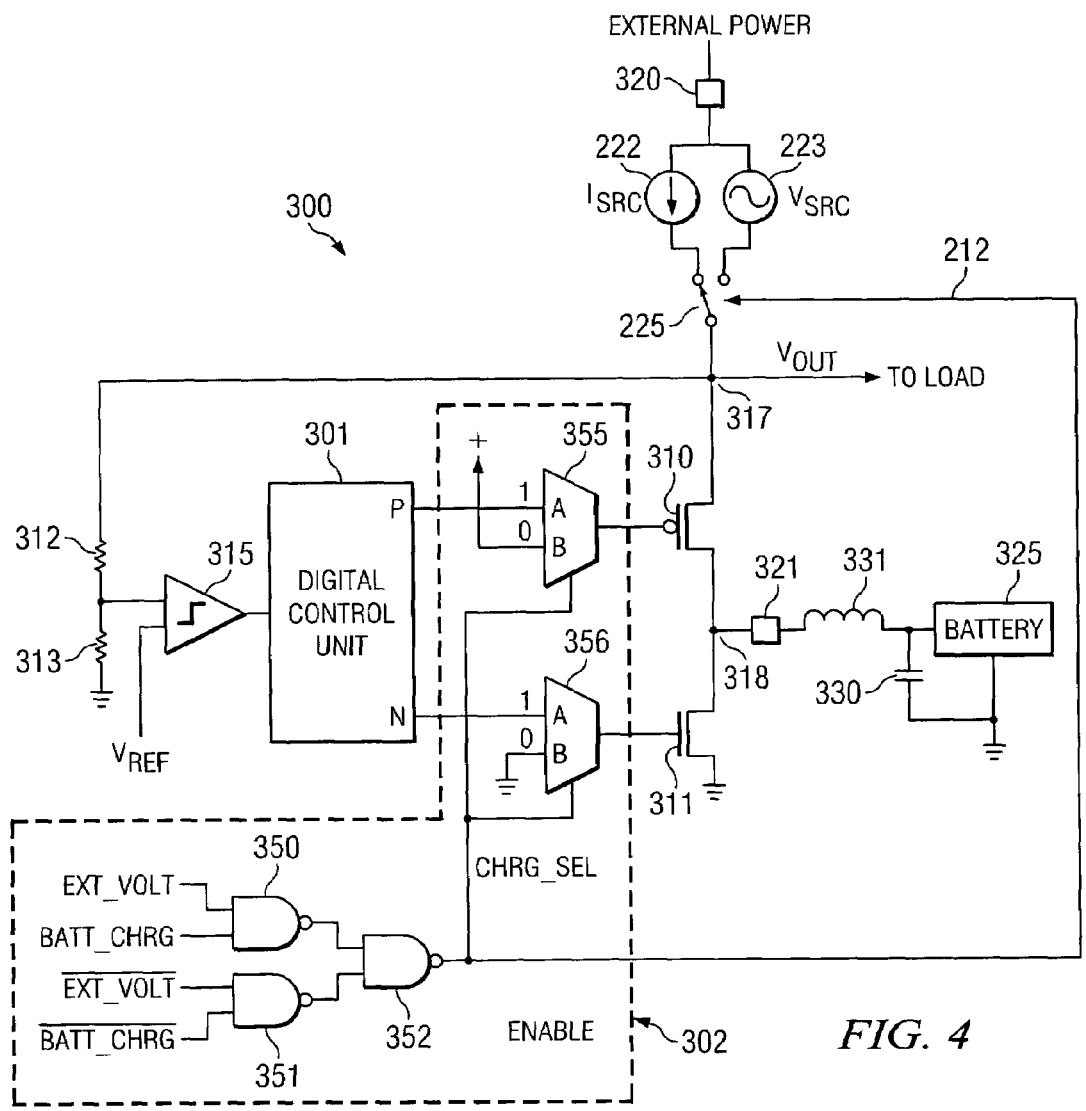
FIG. 4 is a circuit schematic diagram illustrating one embodiment to implement the DC-DC converter/charger of FIG. 2.

Referring to FIG. 4, a more detailed circuit 300 is illustrated as one embodiment to implement the DC-DC converter of FIG. 2. Circuit 300 comprises a digital control unit 301, a enable circuit 302, serially-arranged transistors 310 and 311, serially-arranged resistors 312 and 313, and a comparator 315. Circuit 300 also includes the earlier described current source 222, voltage source 223 and switch 225. The external power is shown operably coupled to circuit 300 through terminal 320. Terminals 320 and 321 signify pads, which may be used for external connections. Thus, external power is coupled to terminal 320 and a battery 325 is coupled to terminal 321 in the example circuit 300. A capacitor 330 is shown coupled in parallel to battery 325 and an inductor 331 is coupled in series between terminal 321 and battery 325. It is to be noted that other connections may be coupled to other terminations. For example, $V_{OUT}$ and ground (such as the ground of transistor 311) may be coupled externally through such terminations.

Transistors 310 and 311 are coupled between a node 317 (where $V_{OUT}$ is obtained) and ground. Transistor 310 in this embodiment is a P-channel device, while transistor 311 is an N-channel device. The battery input at terminal 321 is coupled to a node 318 disposed between a junction of the two transistors 310, 311. The $V_{OUT}$ voltage at node 317 is coupled back in a feedback loop to one input of the comparator 315 through the voltage division provided by the voltage divider network of resistors 312, 313. A reference voltage, noted as $V_{REF}$, provides a reference for comparator 315. In one embodiment, $V_{REF}$ is a bandgap voltage. The output of comparator 315 is coupled to a digital control unit 301 to control the gates of transistors 310, 311. The feedback loop and the digital control unit 301 control the operation of the switching of the transistors 310, 311 to regulate the voltage $V_{OUT}$.

The DC-DC conversion of the battery voltage to $V_{OUT}$ is as follows in one embodiment. N-channel transistor 311 is switched on to draw current from battery 325 and store energy in the field of inductor 331 during one portion of a conversion cycle. During this period, the P-channel transistor 310 is maintained off. During a second portion of the conversion cycle, the N-channel transistor 311 is turned off and the P-channel transistor 310 is switched on. When the P-channel transistor is turned on, inductor 331 discharges through a load coupled to node 317. Thus, by the switching operation of the two transistors 310, 311, the inductor stores the energy from the battery and dissipates the energy through the load.

The value of $V_{OUT}$ is controlled by the feedback loop in which the comparator 315 maintains appropriate timing and duration of the activation of transistors 310, 311 to force the voltage at the connection of resistors 312 and 313 to be approximately equal to $V_{REF}$. The reference voltage $V_{REF}$ controls the value of $V_{OUT}$ by establishing the switching point of transistors 310, 311. Thus, when an external power source is not present on terminal 320, battery 325 sources the desired $V_{OUT}$ voltage at node 317 and to the load. Typically, a filtering component or network is present to filter the voltage from the converter to provide a fairly constant $V_{OUT}$ value. The feedback loop of comparator 315 allows the digital control unit 301 to place control signals on P and N control lines to the corresponding gates of transistors 310 and 311. It is to be noted that the circuitry described above to provide DC-DC conversion of the battery voltage to provide $V_{OUT}$ may incorporate other circuitry as well. For example, U.S. Pat. No. 6,204,651 discloses a detailed switch mode converter that may be implemented as an embodiment for circuit 300 shown in FIG. 3. Thus, in the battery-operated mode of operation, the battery voltage is converted to generate $V_{OUT}$.

When external power is coupled to terminal 320, transistors 310 and 311 need not operate as a switching converter to transfer the converted battery voltage to $V_{OUT}$ at node 317, since external power is present. As noted above, in one embodiment, coupling of the USB 2.0 link allows 5 volts (nominal) to be present on terminal 320. Although the disclosure uses the USB for the external power source, other source connections may be used in other embodiments.

As described above, the external power input at terminal 320 is used to generate the current source 222 or the voltage source 223, depending on the external-powered or the battery-charge mode of operation selected. In the external powered mode of operation, the voltage source ($V_{SRC}$) generates $V_{OUT}$. In the external powered mode, the transistors 310, 311 are disabled. However, if the circuit is in the battery-charge mode of operation, the transistors 310, 311 are enabled and the current source ($I_{SRC}$) 222 is used.

The operation of the transistor circuitry is essentially equivalent between the battery-operated mode and the battery-charge mode. Regulation of $V_{OUT}$ is maintained through the feedback loop to maintain node 317 at a specified value However, in this instance, current flow is through inductor 331 to charge battery 325. That is, in one portion of the charging cycle, P-channel transistor 310 is on and N-channel transistor 311 is off, to induce inductor current to store energy in the field of inductor 331. Then, transistor 310 is turned off, while transistor 311 is turned on to allow the field to discharge energy into battery 325. This charging operation is in reverse to the power conversion operation performed when the battery supplies the voltage to the load.

Accordingly, the P-channel and N-channel transistor pairs 310, 311 operate to charge the battery and to regulate $V_{OUT}$ to the load when in the battery-charge mode of operation. The feedback loop provided by comparator 315 and digital control unit 301 are employed to control the switching of transistors 310, 311, as well as disabling the operation of both transistors, when in the external powered mode of operation.

Enable circuit 302 (equivalently corresponding to the enable circuit 204 of FIG. 2) provides the necessary logic to control the enabling/disabling of the transistors 310, 311 when external power is present. Although a variety of logic circuitry may be implemented, one embodiment for enable circuit 302 is shown in FIG. 4. In the particular embodiment shown, two sets of software control signals are generated by the software, such as software associate with control unit 203 of FIG. 2, to control the operation of multiplexers (MUXs) 355 and 356. In the example, the two software-generated signals are external voltage present ($EXT_{13}$ VOLT) and battery charge ($BATT_{13}$ CHRG) and their complements. The $EXT_{13}$ VOLT signal signifies the presence of the external voltage provided at terminal 320. The $BATT_{13}$ CHRG signal designates when battery charging is to be performed. As shown in the diagram, the $EXT_{13}$ VOLT and $BATT_{13}$ CHRG signals are coupled as inputs to a NAND gate 350. The complements of the $EXT_{13}$ VOLT and $BATT_{13}$ CHRG signals are coupled as inputs to a NAND gate 351. The outputs of the two NAND gates 350, 351 are coupled as inputs to a NAND gate 352 which output $CHRG_{13}$ SEL is used as a select signal for the two MUXs 355, 356, as well as to control the operation of switch 225.

When the external voltage is not present at terminal 320, the $EXT_{13}$ VOLT has a logic 0 (and its complement logic 1), while the $BATT_{13}$ CHRG input is maintained at logic 0 as well, since battery charging is not permitted when external power is not present. The state of the $CHRG_{13}$ SEL signal is logic 1 so that the MUXs allow the positive (P) and negative (N) control signals to be coupled to the gates of transistors 310 and 311, respectively, to enable the two transistors to operate. In this battery-operated mode, the battery provides the voltage to the load at node 317.

When the external power source is present at terminal 320, the $EXT_{13}$ VOLT signal is high (and the $EXT_{13}$ VOLT complement is low) so that the state of the $BATT_{13}$ CHRG signal will determine if the MUXs will allow the P and N output of the digital control unit 301 to be coupled to the gates of the two transistors 310, 311. If the $BATT_{13}$ CHRG is low then input B of the two MUXs are coupled to the gates of the two transistors to ensure that the transistors are disabled. Thus, with the presence of the external voltage providing power to the load, the battery charge control signal $BATT_{13}$ CHRG (and its complement) controls if the transistors 310, 311 are enabled in the battery-charge mode or if these two transistors are disabled in the external powered mode.

As was described earlier in reference to FIG. 2 regarding the control unit 203, in one embodiment the control unit 203 generates the control signals $EXT_{13}$ VOLT and $BATT_{13}$ CHRG (and their complements). The enable circuit 302 enables/disables the transistors 310, 311 depending on whether the external powered mode or the battery-charge mode of operation is to be maintained. Thus, if the battery is not present or is inoperative, or is fully charged, then the $BATT_{13}$ CHRG signal will disable the transistors 310 and 311 to ensure that charging current is not made available at terminal 321.

Figure 5:
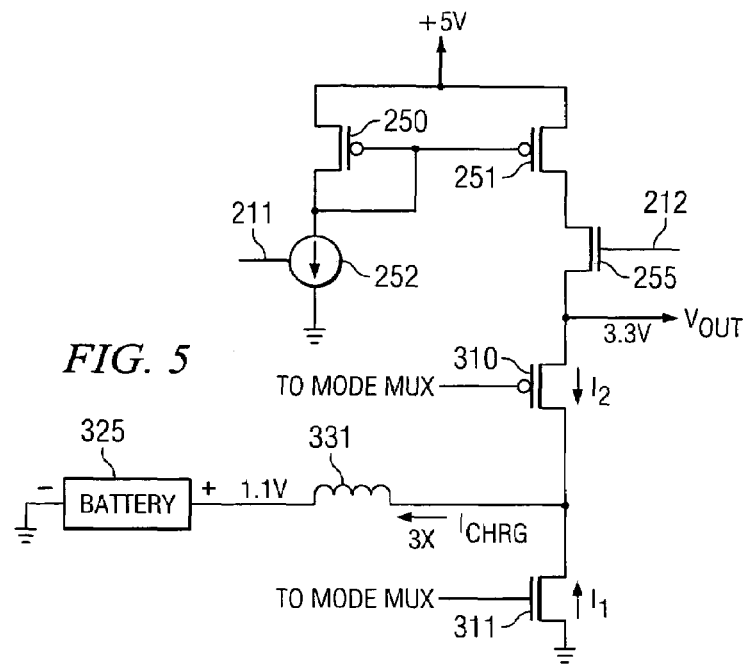
FIG. 5 is a circuit schematic diagram showing DC-DC conversion switching transistors of the circuit of FIG. 4 utilized in a battery-charge mode to charge a battery.

FIG. 5 illustrates one example embodiment of the operation of the two transistors 310, 311 during a battery-charging phase. In this particular example, the $V_{OUT}$ voltage is established at approximately 3.3 volts, while the fully charged battery voltage is established at approximately 1.1 volt. As described above, in the charging mode P-channel transistor 310 is turned on, while N-channel transistor 311 is turned off to provide the charge current to the battery to store energy in inductor 331 during a first portion of the cycle. Alternatively, the operation of the two transistors switch, when during a second portion of the charging cycle, the stored energy is discharged into the battery when N-channel transistor 311 is turned on. In this instance, since the charging voltage differential between $V_{OUT}$ and the battery, is 3 (3.3/1.1), the charging current $I_{CHRG}$ through the inductor may be as much as 3 times the current through transistor 310 when the inductor is used with a switching converter to charge the battery. Thus, the battery may be charged at a faster rate than if the current created via transistor 251 was connected directly to the battery 325.

When the circuit operates in the battery-charge mode to charge the battery, the external power source is used to generate a current source, such as current source 222. Accordingly, the earlier described circuit for current source 222 of FIG. 3 is employed to illustrate the charging phase. In this particular example, a transistor 255 is used to represent the switch 225 of FIG. 3. Control line 212 is coupled to the gate of transistor 255 to activate transistor 255 when the current source is to be inserted into the circuit.

It is to be noted that the duty cycles of the switching times of the transistors 310, 311 may be different depending on the particular circuit design implemented. In one embodiment, the control loop acts to maintain equal but opposite di during the two switch phases. This is based on $dV=L*di/dt$, so $di=(dV/L)*dt$. In one example, the voltage across the inductor (dV) is twice as large when transistor 310 is on, so the time transistor 311 is on is twice as long for equal magnitude of di. This and other duty cycles may be employed with the operation of transistors 310, 311.

Figure 6:
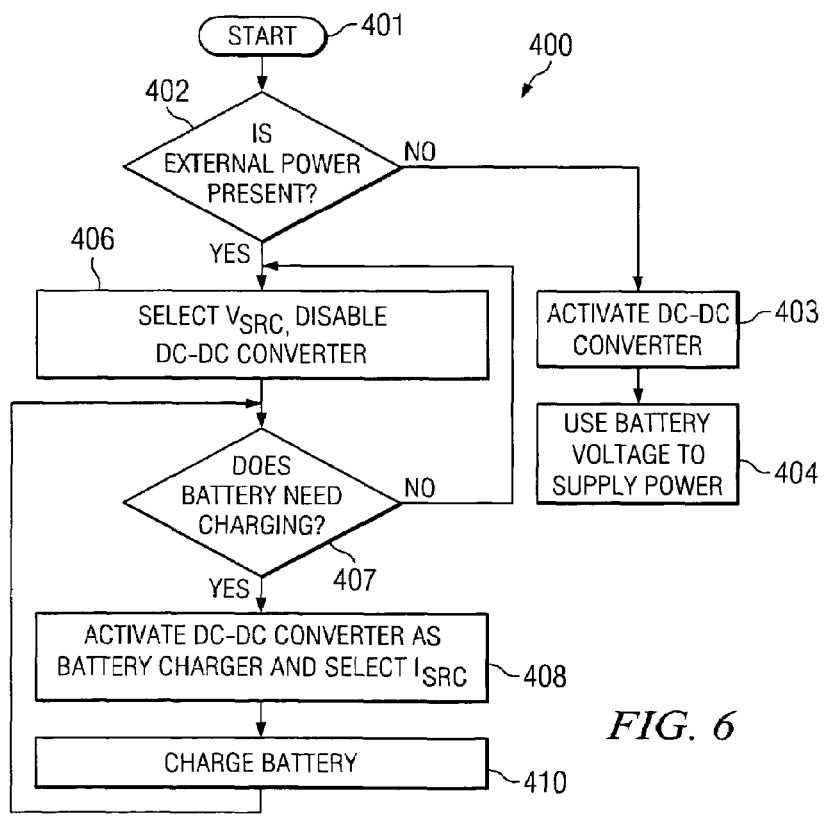
FIG. 6 is a flowchart illustrating one technique to operate programming software to control the DC-DC conversion and charging operations for the circuits of FIGS. 2-4.

Referring to FIG. 6, a flow diagram 400 is shown to exemplify one embodiment for the implementation of the DC-DC conversion and battery charging operations. At the start (block 401), a control unit (which may be software) determines if external power source, such as the USB 2.0 connection, is present (block 402). If the external power is not present then the DC-DC converter function is activated (block 403) so that the battery voltage is used to supply power to the load (block 404) in the battery-operated mode. This is the first mode of operation. Alternatively, if the external power is present, then the external power is used to supply power to the load (block 406). Initially, the second mode (external powered mode) is initiated and the DC-DC converter is disabled (block 406). Then, the battery is checked to determine if it needs charging (block 407). If the battery needs charging, then the DC-DC converter circuit is enabled and the current source employed (block 408) to charge the battery (block 410) in the third (battery-charge) mode. In the event the battery does not require charging (block 407), the DC-DC converter is disabled and the voltage source inserted to provide $V_{OUT}$ in the external powered mode. It is to be appreciated that the software diagram of FIG. 6 is but one embodiment for performing the software operation described above.

Furthermore, it is to be noted that a number of advantages are derived from the use of the various embodiments described herein. Instead of having a separate DC-DC converter and a battery charging circuit, portions of the DC-DC converter circuitry may be utilized to perform the operation of charging the battery. In the example embodiments described, switching transistors are utilized to provide the DC-DC conversion in the battery-operated mode and also used to charge the battery in the battery-charge mode. The converter circuit may behave identically in the battery-operated mode as well as in the battery-charge mode. The particular control loop employed does not care which direction the current flows, The control loop simply adjusts the duty cycle to maintain $V_{OUT}$ at the target or specified voltage in both instances.

Additionally, since the embodiments described utilize an inductor to store and transfer energy to and from the battery, the charge current may be maintained at a larger value while still minimizing the current drawn from the external source. Also, the use of the same circuit for conversion and battery charging allows duplicity of operation and may utilize less components to provide the two functions.

We claim:

1. An apparatus comprising:
    a converter within an integrated circuit to convert a battery voltage from a battery to an output voltage to power the integrated circuit in a battery-operated mode of operation, when the battery is made available to the integrated circuit, wherein the converter includes a switching transistor circuit to alternately switch transistors to regulate the output voltage in the battery-operated mode of operation and in a battery-charge mode of operation, but the switching transistor circuit is disabled in an external powered mode of operation, when external power is present and the battery is not to be charged; and
    a control unit to switch the converter in one of three modes, the battery-operated mode to convert the battery voltage to the output voltage when the external power is not present, the battery-charge mode to employ the external power to generate a current source to charge the battery and maintain the output voltage when the external power is present, and an external powered mode of operation to employ the external power to generate a voltage source to source the output voltage when the external power is present.

2. The apparatus of claim 1 further comprising an analog to digital converter to monitor the battery voltage and to transmit a signal to the control unit to indicate when the battery is to be charged.

3. The apparatus of claim 1, wherein the integrated circuit receives the external power from a Universal Serial Bus link.

4. A direct current-direct current (DC-DC) converter, which is also employed as a battery charger, comprising:
    a switching transistor circuit to convert a battery voltage from a battery to an output voltage to power an integrated circuit in a battery-operated mode when the battery is made available to the integrated circuit at a first node, the switching transistor circuit including alternately switching transistors to regulate the output voltage at a second node in the battery-operated mode, the switching transistors also to regulate the output voltage at the second node and to provide charge current to charge the battery in a battery-charge mode when external power from an external source is present;
    a control unit to control operation of the converter in one of three modes, the battery-operated mode to convert the battery voltage to the output voltage when the external power is not present, the battery-charge mode to employ the external power to generate a current source to charge the battery and maintain the output voltage at the second node when the external power is present, and an external powered mode-to employ the external power to generate a voltage source to source the output voltage at the second node when the external power is present; and
    an enabling circuit to operate with the control unit to disable the switching transistors in the external powered mode and enable the switching transistors in the battery-operated and battery-charge modes.

5. The DC-DC converter of claim 4, wherein the enabling circuit controls signals to gates of the switching transistors to enable and disable the switching transistors.

6. The DC-DC convener of claim 5, wherein when the external power is present, the control unit to initiate the battery-charge mode-only if the battery needs charging.

7. The DC-DC convener of claim 6, wherein the enabling circuit to control enabling or disabling of the switching transistors under control of the control unit to toggle between the battery-charge and external powered modes, when the external power is present.

8. The DC-DC converter of claim 7, further comprising a switch controlled by the control unit select between the external powered and battery-charge modes in response to a state of charge of the battery.

9. The DC-DC converter of claim 8, further comprising an analog to digital converter to monitor the battery voltage and to transmit a digital signal to the control unit to indicate if the battery needs to be charged.

10. The DC-DC converter of claim 8, wherein the integrated circuit receives the external power from a Universal Serial Bus link.

11. An integrated circuit which has an audio system integrated therein, comprising:
    an input interface to receive audio data input;
    a digital signal processor to receive the audio input and generate processed audio data;
    an output amplifier to output the processed audio data external to the integrated circuit; and
    a direct current-direct current (DC-DC) converter, which is also employed as a battery charger, the DC-DC converter comprising:
        (a) a switching transistor circuit to convert a battery voltage from a battery to an output voltage to power an integrated circuit in a battery-operated mode when the battery is made available to the integrated circuit at a first node, the switching transistor circuit including alternately switching transistors to regulate the output voltage at a second node in the battery-operated mode, the switching transistors also to regulate the output voltage at the second node and to provide charge current to charge the battery in a battery-charge mode when external power from an external source is present;
        (b) a control unit to control operation of the converter in one of three modes, the battery-operated mode to convert the battery voltage to the output voltage when the external power is not present, the battery-charge mode to employ the external power to generate a current source to charge the battery and maintain the output voltage at the second node when the external power is present, and an external powered mode to employ the external power to generate a voltage source to source the output voltage at the second node when the external power is present; and
        (c) an enabling circuit to operate with the control unit to disable the switching transistors in the external powered mode and enable the switching transistors in the battery-operated and battery-charge modes.

12. The integrated circuit of claim 11, wherein when the external power is present, the control unit to initiate the battery-charge mode only if the battery needs charging.

13. The integrated circuit of claim 12, wherein the enabling circuit to control enabling or disabling of the switching transistors under control of the control unit to toggle between the battery-charge and external powered modes, when the external power is present.

14. The integrated circuit of claim 13, wherein the DC-DC converter further comprising an analog to digital converter to monitor the battery voltage and to transmit a digital signal to the control unit to indicate if the external battery needs to be charged.

15. The integrated circuit of claim 13, wherein the external power is received from a Universal Serial Bus link.

16. A method of employing a direct current-direct current (DC-DC) converter to charge a battery comprising:
   monitoring to determine if external power from a data transfer link is present to power an integrated circuit;
   providing a DC-DC conversion in a first mode of operation to convert a battery voltage to generate an output voltage to power the integrated circuit, if the external power is not present;
   utilizing the external power to generate a voltage source to provide the output voltage to power the integrated circuit in a second mode of operation when external power from the data transfer link is present, the second mode of operation disabling circuitry for the DC-DC conversion; and
   utilizing the external power to generate a current source to power the circuitry for the DC-DC conversion to power the integrated circuit in a third mode of operation and also utilizing the same circuitry for the DC-DC conversion to charge the battery.

17. The method of claim 16 further comprising monitoring the battery voltage to determine if the battery needs charging when the external power is present to power the integrated circuit.

18. The method of claim 17, wherein the external power is provided from a Universal Serial Bus link.

19. The method of claim 17, wherein the external power is provided from a Universal Serial Bus 2.0 link.

* * * * *